US011965636B2

United States Patent
(12) United States Patent
Zauner et al.

(10) Patent No.: US 11,965,636 B2
(45) Date of Patent: Apr. 23, 2024

(54) HEADLIGHT WITH ANTI-CONDENSATION PROTECTION DEVICE

(71) Applicant: ZKW Group GmbH, Wieselburg (AT)

(72) Inventors: Stephan Zauner, Krustetten (AT); Sebastian Godderidge, Schollach (AT)

(73) Assignee: ZKW Group GmbH, Wieselburg (AT)

( * ) Notice: Subject to any disclaimer, the term of this patent is extended or adjusted under 35 U.S.C. 154(b) by 105 days.

(21) Appl. No.: 17/770,443

(22) PCT Filed: Nov. 11, 2020

(86) PCT No.: PCT/EP2020/081760
§ 371 (c)(1),
(2) Date: Apr. 20, 2022

(87) PCT Pub. No.: WO2021/094370
PCT Pub. Date: May 20, 2021

(65) Prior Publication Data
US 2022/0373157 A1 Nov. 24, 2022

(30) Foreign Application Priority Data
Nov. 14, 2019 (EP) .................................... 19209156

(51) Int. Cl.
*F21S 45/60* (2018.01)
*F21S 41/13* (2018.01)
(Continued)

(52) U.S. Cl.
CPC ............... *F21S 45/60* (2018.01); *F21S 41/13* (2018.01); *F21S 41/143* (2018.01); *F21S 45/20* (2018.01)

(58) Field of Classification Search
CPC .. F21S 45/60; F21S 45/20; F21S 41/13; F21S 41/143
See application file for complete search history.

(56) References Cited

FOREIGN PATENT DOCUMENTS

DE 102004031033 A1 1/2006
DE 102007043961 A1 3/2009
(Continued)

OTHER PUBLICATIONS

English machine translation of DE 102013001287A1 (Year: 2013).*
(Continued)

*Primary Examiner* — Anne M Hines
(74) *Attorney, Agent, or Firm* — Eversheds Sutherland (US) LLP

(57) ABSTRACT

The invention relates to a headlight (1), comprising a headlight housing (10) with a light exit opening (12), which is closed by means of a cover plate (11), at least one LED light source (21), which is arranged in at least one light module (20) positioned in the headlight housing (10) for generating a specified light distribution in front of the headlight (1), as well as a condensation protection device (30) with at least one air duct (40) for guiding air (41), as well as with at least one radiation emitter (60), wherein the at least one air duct (40) has an air entry opening (42) and at least one air exit opening (43), and the air exit opening (43) preferably faces the cover plate (11), as well as the air (41) guided in the air duct (40) can be heated up by means of the thermal radiation generated by the radiation emitter (60). The at least one radiation emitter (60) is arranged within the air duct (40) in the region of the air entry opening (42), wherein the air duct (40) is made of an infrared radiation-reflecting as well as light-impermeable wall material (45), and the air duct (40) has at least one curved longitudinal axial section (50) with a radius of curvature (51) and an angle of curvature (52) between the air entry opening (42) and the air exit opening (43).

19 Claims, 3 Drawing Sheets

(51) Int. Cl.
*F21S 41/143* (2018.01)
*F21S 45/20* (2018.01)

(56) References Cited

FOREIGN PATENT DOCUMENTS

| | | | |
|---|---|---|---|
| DE | 102013001287 | A1 | 7/2014 |
| DE | 102014110841 | A1 | 2/2016 |

OTHER PUBLICATIONS

International Search Report for PCT/EP2020/081760 dated Dec. 29, 2020 (10 pages).

Search Report for European Patent Application No. 19209156.9 dated Apr. 8, 2020 (8 pages).

* cited by examiner

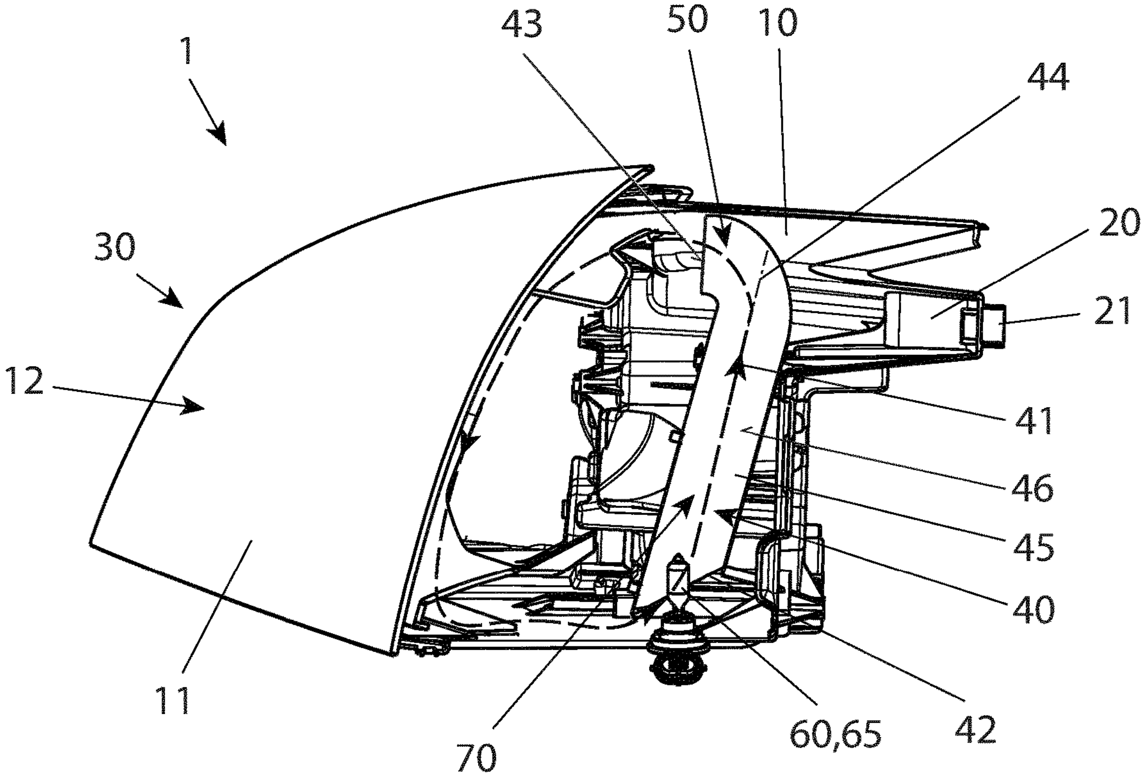
Fig.1
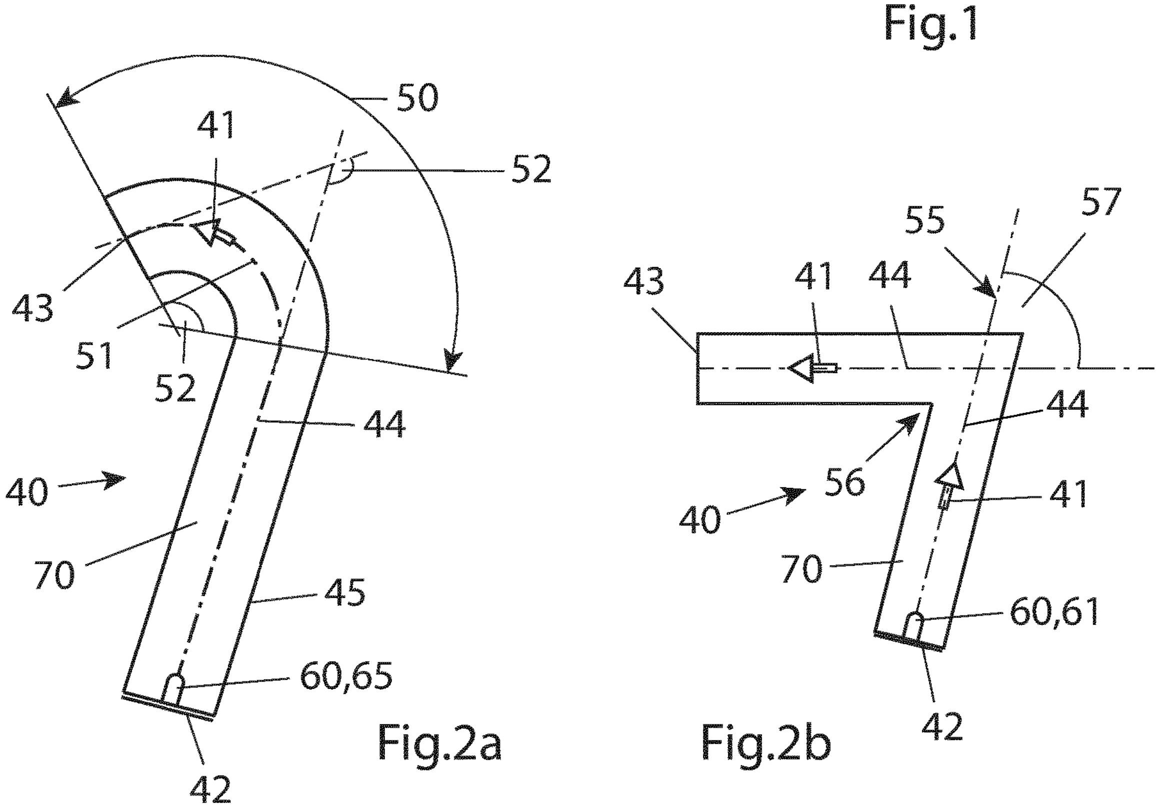
Fig.2a Fig.2b
Fig.2

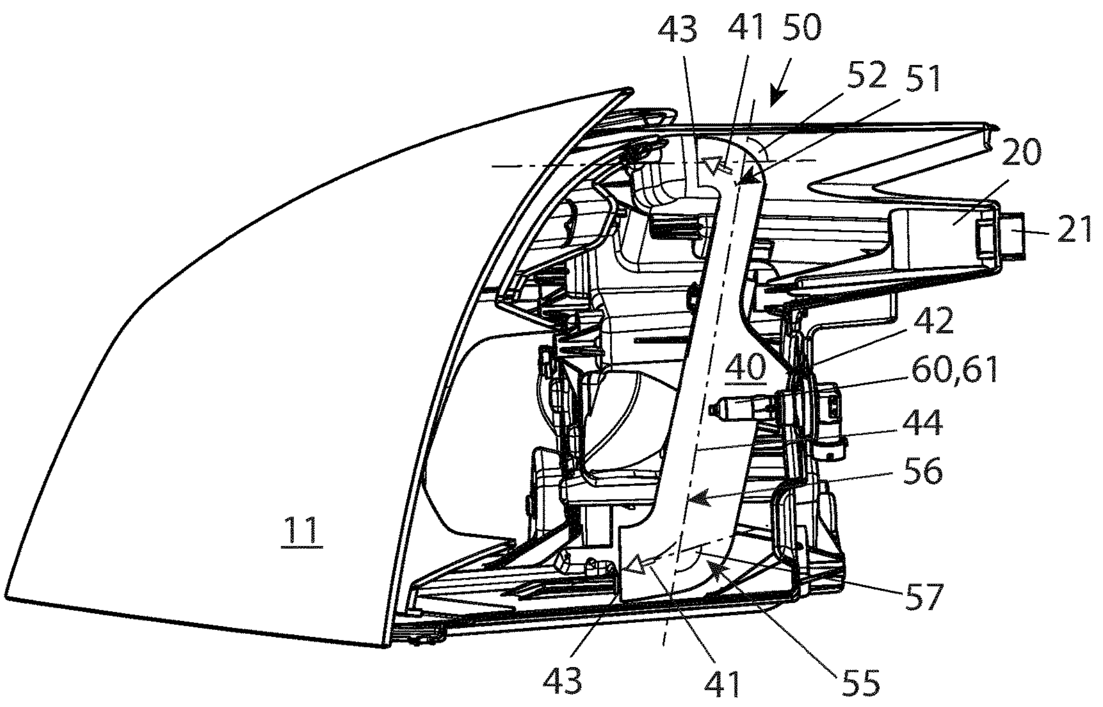
Fig.5
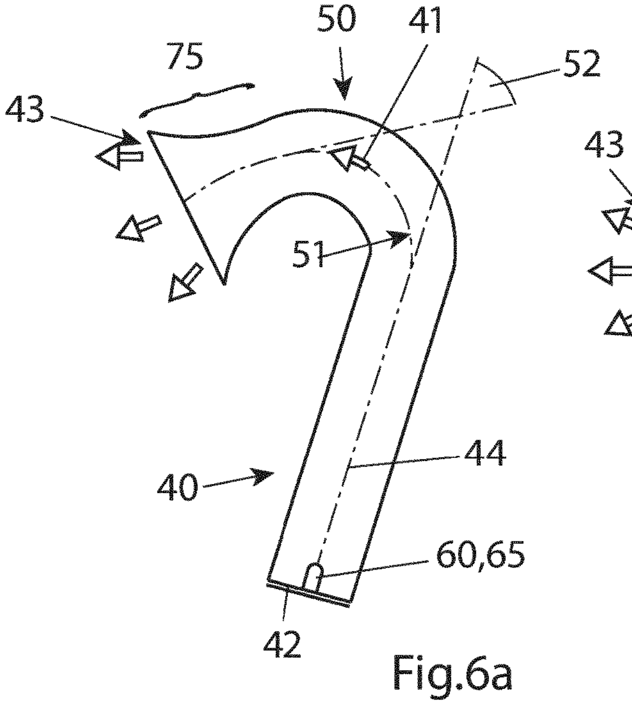
Fig.6a
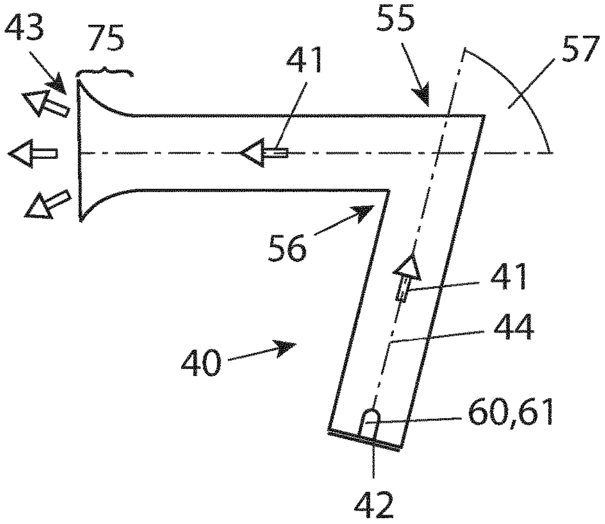
Fig.6b
Fig.6

HEADLIGHT WITH ANTI-CONDENSATION PROTECTION DEVICE

The invention relates to a headlight, in particular a motor vehicle headlight, comprising a headlight housing with a light exit opening, which is closed by means of a cover plate, at least one LED light source, which is arranged in at least one light module positioned in the headlight housing for generating a specified light distribution in front of the headlight, as well as a condensation protection device arranged in the headlight housing with at least one air duct for guiding air, as well as with at least one radiation emitter, wherein the at least one air duct has an air entry opening and at least one air exit opening, and the air exit opening preferably faces the cover plate, as well as the air guided in the air duct can be heated up by means of the thermal radiation generated by the radiation emitter.

In the case of headlights, in particular in the case of motor vehicle headlights, the unwanted formation of drops of water or films of water and/or the formation of films of ice occurs frequently, which can be created by means of separation of excess moisture from the air as a result of condensation or formation of frost in the case of unfavorable weather conditions, for example in the case of rain, snowfall, fog, or freezing fog.

That water, which deposits on a cool surface of objects as soon as water vapor-containing air or water vapor-containing gas is cooled down to below the dew point there, is generally referred to as condensation water or perspiration water, respectively, or melt water. The condensation on technical objects, such as, for example, on cover plates or in the housing interior of vehicle headlights is referred to as condensation or as fogging.

Different embodiments of headlight trace heating systems, which serve as condensation protection, are already known from the prior art. For example, the document EP 0 859 188 A2 relates to a headlight condensation protection, in the case of which the waste heat of a conventional quartz bulb base of a low-beam lamp and/or of a high beam lamp, which typically becomes as hot as 900° C. during operation of the lamp, is guided in the interior of the headlight housing by means of a reflector in the direction of the cover plate of the headlight housing and heats up the latter and thus ensures a condensation-free cover plate or condensate-free surfaces in the headlight housing, respectively. For modern vehicle headlights, the light modules of which have at least one light source for emitting the light for generating the light distribution and which are formed as a semiconductor light source, preferably as a light emitting diode (LED), this conventional version of the trace heating system of the headlight housing is no longer sufficient due to the waste heat, which is too low, of the energy-saving light source, such as for example light emitting diodes.

The document DE 10 2011 084 114 A1 relates to a conventional motor vehicle headlight with a headlight housing and a light exit opening, which is closed by means of a cover plate. A light module for generating a specified light distribution in front of the vehicle is located in the housing. A fan device together with a heating element followed by a tubular air duct is further arranged in the housing, wherein the heating element is integrated within the fan device. The heating element can be formed, for example, as heating sleeve, which encases the air duct from the outside, as heating conductor, heating coil, heating tape, heating mat, or heating register. The fan device serves the purpose of allowing heated-up air to circulate within the headlight housing and to thus ensure condensate-free surfaces in the headlight housing. A disadvantage of this embodiment is at least that the fan device is structurally complex, for example in the form of an axial fan with integrated heating elements, as well as causes increased operating and maintenance costs during ongoing operation.

A headlight for a motor vehicle has further become known from the document DE 10 2004 025 623 A1, in the case of which a light emitting diode assembly serves as main light source. Due to the fact, however, that modern white light emitting diodes—in contrast to conventional headlights with currently common halogen light sources—virtually do not generate any infrared heat in the light cone, which could serve to defrost or de-ice the headlight cover plate, respectively, a separate heat conducting means is provided as headlight condensation protection in the case of this headlight. The heat conducting means serves to exchange heat, which is generated on the rear side of the light emitting surfaces of the light emitting diode assemblies, and an airflow in the interior of the headlight. For this purpose, the heat conducting means is equipped with air guiding means and is preferably formed as cooling body with cooling fins, wherein the intermediate spaces of the cooling fins form air guiding ducts. The cooling fins are thereby embodied parallel to the airflow, which guides the waste heat of the light emitting diodes to the cover plate of the headlight. Due to the fact that the heat source of the light emitting diodes cannot be regulated, it is proposed to this end to additionally provide a heat exchanger, so that heat can optionally be supplied to the airflow by means of the heat exchanger, or vice versa, heat can be extracted from the airflow.

It is at least a disadvantage of this embodiment that the waste heat of the light emitting diodes is mostly too small in order to ensure a sufficient trace heating of the cover plate of the headlight in the case of extreme weather conditions in the case of snowfall or fog or in the case of particularly low temperatures, respectively. In terms of equipment, the provided heat conducting means as well as an additionally required heat exchanger for the temperature regulation of the airflow are further complex and expensive.

Modern LED headlights are constructed so that the light emitting diodes generate as little heat as possible. In the ongoing operation of the headlight, an airflow in direct contact with a cooling body, which is usually arranged on the rear side of the light emitting surfaces of the light emitting diodes, can mostly reach temperatures of maximally 80° to 100° C., wherein the airflow, however, is already cooled down strongly again on its way to the cover plate. The concepts, which have become known to date, are thus unsuitable for a quick de-icing and defrosting of cover plates or for avoiding unwanted condensate formation of vehicles, respectively, provided that they are LED vehicle headlights.

The device for defrosting a lighting unit, which has become known from the document DE 10 2012 005 874 A1, is also complex, because several light emitting diodes are arranged with their rear sides on the outer side of an air duct there, which is arranged in the interior of a vehicle headlight. The air duct thereby extends from a rear side of a reflector through the latter in the direction of the cover plate of the headlight. Waste heat from the engine compartment of the motor vehicle, which reaches from a fan, which is located in the engine compartment, within the air duct into the interior of the vehicle headlight, is thereby further heated up by means of the waste heat, which is generated on the rear sides of the light emitting diodes, which are fastened to the air duct on the outer side. In order to improve the air guidance towards the cover plate, the air duct has a nozzle on its front free end, which is oriented towards the cover plate.

The likewise high structural effort, namely of arranging the air duct so that said air duct protrudes through the reflector and forms a connection between the interior of the vehicle headlight and the engine compartment, without thereby interfering with the desired light distribution of the reflector, is a disadvantage of this embodiment. It is further a disadvantage that the effect of this defrosting device for the headlight sets in only when the operating temperature of the internal combustion engine in the engine compartment reaches correspondingly high values, for example of over 100° C. A quick defrosting and de-icing of the cover plates of the vehicle headlight is also not possible by means of this complex device.

The present invention thus has the object of providing a headlight with a condensation protection device for the trace heating of the headlight, which avoids the described disadvantages of the prior art, wherein the condensation protection device is to ensure a de-icing time, which is as short as possible, of the cover plates of the headlight, which is equipped therewith. The condensation protection device is to further be integrated in the interior of the vehicle headlight so as to be constructed simply in its construction method, as well as is to be cost-efficient and as maintenance-free as possible during the ongoing heating operation.

According to the invention, these objects are solved in the case of a generic headlight with the features of the characterizing part of claim 1. Advantageous designs and further developments of the invention are specified in the subclaims and the description.

The invention further also provides a motor vehicle with at least one headlight with a condensation protection device.

According to the invention, the at least one radiation emitter is arranged within the air duct in the region of the air entry opening in the case of a headlight, in particular a motor vehicle headlight, which comprises a headlight housing with a light exit opening, which is closed by means of a cover plate, at least one LED light source, which is arranged in at least one light module positioned in the headlight housing for generating a specified light distribution in front of the headlight, a condensation protection device arranged in the headlight housing, with at least one air duct for guiding air as well as at least one radiation emitter, wherein the at least one air duct has an air entry opening and at least one air exit opening, and the at least one air exit opening preferably faces the cover plate, as well as the air guided in the air duct can be heated up by means of the thermal radiation generated by the radiation emitter, wherein the air duct is made of an infrared radiation-reflecting as well as light-impermeable wall material, and the air duct has at least one curved longitudinal axial section with a radius of curvature and an angle of curvature between the air entry opening and the at least one air exit opening.

In the case of a headlight according to the invention, the air duct of the condensation protection device is advantageously designed so that the exit of visible light at the at least one air exit opening is avoided when supplying thermal radiation in the form of infrared radiation through the radiation emitter arranged within the air duct. This is ensured by means of at least one curved longitudinal axial section between the air entry opening, at which the radiation emitter is arranged, and the air exit opening. The at least one air duct can thereby have one or several curved sections. The air duct is thereby formed so that visible thermal radiation portions of the radiation emitter are correspondingly reflected or totally reflected, respectively, on the inner surfaces of the curved longitudinal axial sections of the air duct. Moreover, the air duct is made of an infrared radiation-reflecting as well as light-impermeable wall material.

With regard to the definition of what is understood under the term of the curvature or under a curved longitudinal axial section, respectively, in the context of the present application:

The curvature of a plane curve is understood to be the change in direction when passing through the curve. The curvature of a straight line equals zero throughout because the direction thereof does not change. An (arc of a) circle with a radius r has the same curvature throughout because its direction changes equally strongly throughout. The smaller the radius of the circle, the larger its curvature. The variable $$\frac{1}{r} = \frac{\Delta\varphi}{\Delta s},$$

the ratio of centering angle or angle of curvature and length of an arc of a circle serves as measure for the curvature of a circle. The centering angle or angle of curvature, respectively, equals the exterior angle between the tangent lines to circles in the end points of the arcuate curve piece. To define the curvature of any curve in one point, one thus looks at a curve piece of the length Δs, which includes the point in question and the tangents of which intersect at the angle Δφ in the end points. The curvature κ in that point is thus defined by means of $$\kappa = \frac{\Delta\varphi}{\Delta s}.$$

If the curvature does not equal zero in one point, then the reciprocal value of the curvature is referred to as radius of curvature. In the case that the curvature is infinitely large in one point, the radius of curvature is zero at this location, and the curve "bends" or forms a bend point, respectively. A bend point is thus a point, at which a curve strongly changes its curvature and, associated therewith, its direction. The corner points of a rectangle are such bend points, for example.

In the extreme case of a radius of curvature=0 (zero), a curved longitudinal axial section of the air duct is to also be understood as such a bend point of the air duct. An air duct of a condensation protection device according to the invention can thus comprise one or several bend points. An air duct, which consists of two or several straight air duct sections, the longitudinal axes of which in the form of an open polygonal continuous line have one or several bend points, is thus also captured by the invention.

The cross section of the air duct is not subject to any design limitations. The air duct can have, for example, a square, rectangular, triangular, circular, or elliptical cross section in some sections or also continuously. The air duct can thus be shaft-shaped, angular, or tubularly round at least in some sections, depending on specification and space requirement of the headlight. As part of the invention, the air duct can further fork, for example in a Y-shaped manner, and can have two or several air exit openings, from which heated-up air for heating the cover plate radiates in each case. Several air entry openings can likewise open out in a common air exit opening of the air duct. The at least one air exit opening preferably faces the cover plate of the headlight or is at least oriented so that the heated-up air, which flows out of the at least one air exit opening, is guided directly in the direction of the cover plate, if possible.

As is well known to the person of skill in the art, an air module has at least one light source for emitting the light for generating the light distribution, which is formed as light emitting diode (LED) here. To generate the desired light distribution, the light module has, for example, a primary optical unit, for example in the form of a reflector and/or of a TIR (Total Internal Reflection) pre-positioned optical unit, for bundling the light emitted by the semiconductor light source. Moreover, the light module can also have a secondary optical unit, for example in the form of a converging lens, in the beam path of the emitted light, wherein the secondary optical unit projects the bundled light for generating the light distribution onto the roadway in front of the vehicle. If the light distribution is a dimmed light distribution, for example in the form of low beam light or fog light, a screen assembly can also be provided in the light module between the primary optical unit and the secondary optical unit, the upper edge of which (in the case of a vertical screen assembly) or the front edge of which (in the case of a horizontal screen assembly) is projected onto the roadway in front of the vehicle as light/dark limit.

The assignment of the terms with respect to a location or an orientation, such as, for example, "horizontally", "vertically", "in the horizontal direction", "in the vertical direction", "top", "bottom", "front", "under", "above", etc., is furthermore generally only selected for simplification purposes, and these terms possibly refer to the illustration in the drawings, but not necessarily to a current use position or installation position of the condensation protection device or of the air duct with regard to the headlight or the headlight housing thereof, respectively.

In an advantageous version of the invention, the air duct between the air entry opening and the air exit opening in the case of a headlight can have a first curved longitudinal axial section as well as, spaced apart therefrom in the longitudinal axial direction of the air duct, at least one further, second curved longitudinal axial section. By means of a lengthened construction of the air duct, the heated-up air can be guided as closely as possible to the sections of the headlight housing, which are to be heated. It is likewise possible as part of the invention to embody the air duct, comparable with a heat exchanger, in such a way that heated-up air can accumulate within the air duct, and the heated-up air within the air duct has a higher temperature than during the escape of the air from the at least one air exit opening of the air duct. Comparable with a heater, the air duct itself can thus act as heat storage and can heat up the ambient air within the headlight housing.

In a further development of the invention, the radii of curvature as well as the angles of curvature of the first curved longitudinal axial section as well as of the at least second curved longitudinal axial section in the case of a headlight can be identical in each case. In this embodiment, standardized air duct sections can be joined together in an advantageous manner, so as to be able to guide the air duct in the most space-saving manner and as closely as possible to the sections of the headlight housing, which are to be heated.

In an alternative embodiment, the radii of curvature and/or the angles of curvature of the first curved longitudinal axial section as well as of the at least second curved longitudinal axial section can be different in the case of a headlight according to the invention. This embodiment provides the advantage to be able to install an air duct, which saves as much space as possible, within the headlight housing with individually designed air duct sections, which are joined together.

It can be particularly advantageous when the angle of curvature of the at least one curved longitudinal axial section of the air duct in the case of a headlight according to the invention is between 50° and 130°, preferably between 60° and 120°, particularly preferably between 70° and 110°. The listed angles of curvature are to be understood so that these angles of curvature are measured relative to a longitudinal axial direction of a straight section of the air duct.

Depending on orientation and installation position of the air duct with respect to the headlight housing, such a straight length section of the air duct can, for example, point upwards in perpendicular axial direction, wherein the air entry opening together with the radiation emitter is located on the lower end of this perpendicularly aligned air duct. With respect to this assumed perpendicular reference axis, a first curved longitudinal axial section can be curved, for example between 50° and 130° with respect to the perpendicular axial direction. Provided that the angle of curvature is selected to be greater than 90° in this case and is, for example, 120° with respect to the perpendicular axial direction, the free end of the air duct points obliquely downwards with its air exit opening. According to this assumed installation position of the air duct, a highest-lying section thus forms in the region of the curved longitudinal axial section, in which the heated-up air will accumulate before it flows downwards to the air exit opening due to the convection flow—or due to the set forced flow in the case of the use of an additional fan blower. This fact can be utilized in an advantageous manner, in order to form, for example at such a section of the air duct, which is highest-lying with respect to the respective installation space, an air accumulation chamber, which is connected to the air duct and in which the heated-up air can accumulate. As already mentioned above, this conceivable embodiment version can serve the purpose—comparable with a heat exchanger—that heated-up air can accumulate within the air duct and the heated-up air has a higher temperature within the air duct than when the air exits from the at least one air exit opening of the air duct.

In a further advantageous embodiment of the invention, the radius of curvature of the at least one curved longitudinal axial section of the air duct in the case of a headlight can be from 0 mm to 100 mm, preferably from 1 mm to 80 mm. Depending on the embodiment, longitudinal axial sections of the air duct, which have a bend, thus a curvature with a radius of curvature of 0 mm, can thus also be used.

In the case of a headlight according to the invention, the air duct can advantageously be made of a wall material, which is selected from the group consisting of: sheet steel, aluminum, aluminum alloys, metal matrix composite material, plastic, temperature-resistant plastic and/or of a plastic composite material.

Examples include the following temperature-resistant plastics, which are suitable as wall materials: PI polyimide, PEEK polyether ether ketone, PPS polyphenylene sulfide, PA polyamide, PBT polybutylene terephthalate, PET polyethylene terephthalate. Materials, which are already established per se for the production of headlights, in particular of motor vehicle headlights, can thus be used in an advantageous manner for the production of the air duct.

The embodiment version of a headlight according to the invention, in the case of which the radiation emitter is an infrared radiator, preferably a quartz radiator, a halogen radiator, or an infrared lamp, can be particularly advantageous.

Particularly cost-efficient, common infrared radiators can advantageously be used as radiation emitters. In the case of a quartz radiator, a heating resistor, through which the electric current flows, is usually located in a quartz tube, which is filled with inert gas. The temperature of the heating wire can thus be selected to be higher than in the case of a conventional radiant heater. For the most part, a halogen radiator has a higher efficiency than a quartz radiator. Halogen radiators are also used for cooking purposes, among others, underneath ceramic hobs. Infrared lamps (also referred to as red light lamps or heat lamps) are lamps, which predominantly emit invisible thermal radiation. For this purpose, a mostly red filter can be installed in the infrared lamp in order to filter out the remaining (non-red visible light. The used light source can also include these filters directly in its glass envelope. In addition to the (still visible) red light portion, the emitted radiation then mainly only still comprises so-called near infrared radiation (NIR).

A particularly economical and cost-efficient version of the invention is provided by means of a headlight, in the case of which the radiation emitter is a halogen light source. For example, standardized halogen light source H11 or comparable light source can be used as radiation emitters. This has the advantage that these are common replacement parts, which can be obtained quickly and cost-efficiently. Depending on the embodiment of the headlight, it is thus possible that the replacement of a radiation emitter in the form of a halogen light source can be carried out easily and quickly by anyone.

In the case of a headlight according to the invention, the air duct can advantageously be equipped on its inner surfaces with a visible light-absorbing, light-shielding coating, wherein the light-shielding coating is preferably dark, particularly preferably jet-black.

Corresponding light-shielding coating materials can be obtained, for example from ACM Coatings GmbH, a subsidiary of Acktar Ltd. Acktar (see https://www.acm-coatings.de/). Such light-absorbing coatings can be used, for example, in the form of direct coatings. Coatings can likewise be used in the form of foils or films. These are jet-black coated foils and films with or without adhesive layer, with which larger surface sections can also be coated. Depending on the used coating material, excellent absorption values can be attained by means of such light-absorbing foils. For example, such foils can have a hemispherical reflection of below 1% at wavelengths of 10 nm-10,000 nm.

In a further advantageous invention version, the corrosion protection device in the case of a headlight can furthermore comprise a fan blower, which fan blower is connected to the air duct. A fan blower offers the advantage that the heated-up air flowing out of the air duct can be aligned particularly effectively to corresponding sections of the cover plate for defrosting purposes as a result of the forced flow, which is caused by means of the fan blower. This is particularly advantageous in the case of larger headlight housings, for example of trucks, in order to heat up the correspondingly larger volumes within the headlight housing quickly and effectively.

In a further development of the invention, the fan blower can be integrated in the air duct in the case of a headlight. Depending on the embodiment, the fan blower can thereby be arranged completely or at least partially within the air duct. The fan blower is preferably arranged in the vicinity of the radiation emitter, in order to transport the heated-up air as quickly as possible away from the radiation emitter within the air duct.

It can be advantageous when in the case of a headlight according to the invention the air exit opening of the air duct is formed as diffusor for the even air distribution. The exit speed of the air from the air exit opening is evened out or slowed down, respectively, by means of the use of a diffusor. In this embodiment, the air chamber within the headlight housing is thus heated up as evenly as possible.

A motor vehicle with at least one headlight according to the invention is also specified as part of the invention.

Further details, features, and advantages of the invention follow from the following description of exemplary embodiments, which are illustrated schematically in the drawings, in which:

FIG. 1 shows a headlight according to the invention with a condensation protection device in a partially exposed oblique view from the front;

FIG. 2 shows possible versions of air ducts with a curved (FIG. 2*a*) or bent (FIG. 2*b*) longitudinal axial section in schematic drawings;

FIG. 5 shows a further embodiment according to the invention of a headlight in an exposed side with a forked, in each case twice-curved air duct of a condensation protection device in the installation position within the headlight housing;

FIG. 6 shows possible versions of air ducts with a curved (FIG. 6*a*) or bent (FIG. 6*b*) longitudinal axial section in schematic drawings, wherein the air exit opening is in each case formed in the form of a diffusor.

Figure 3:
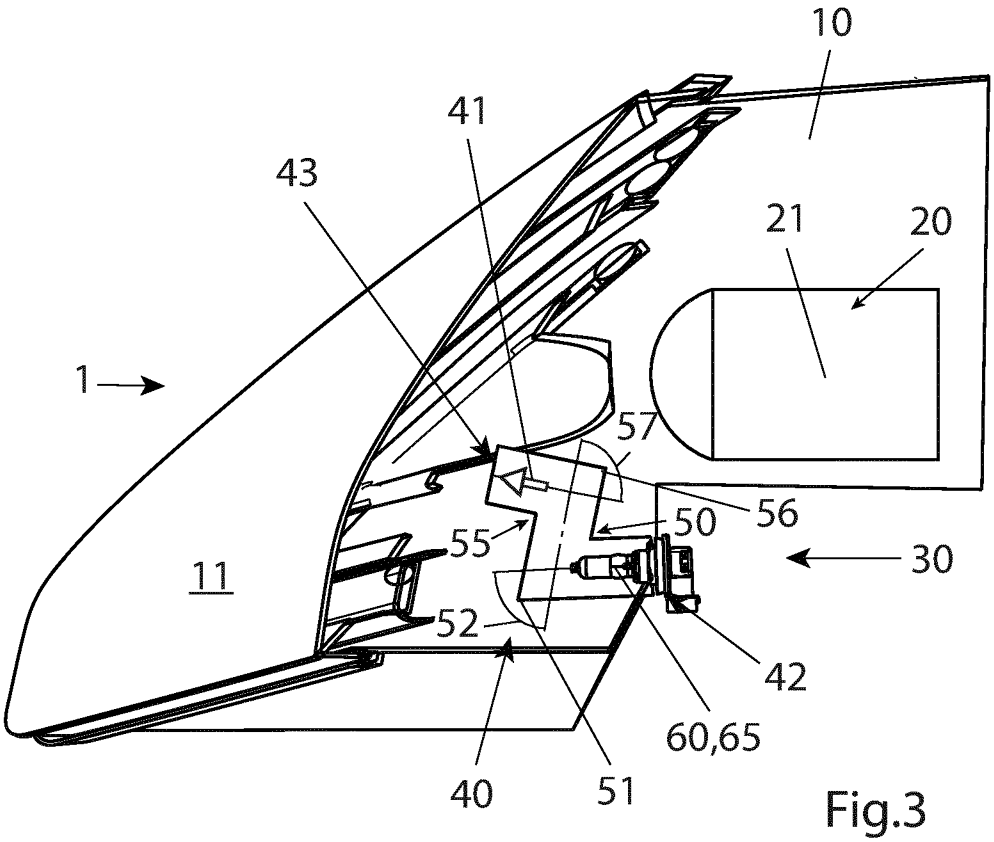
FIG. 3 shows a further embodiment according to the invention of a headlight in an exposed side view with a condensation protection device with a twice-bent air duct in installation position within a headlight housing.

FIG. 1 shows a first headlight 1 according to the invention with a condensation protection device 30. This is a headlight 1 for a motor vehicle. The headlight 1 has a headlight housing 10 together with a cover plate 11, which, in a manner known per se, closes a light exit opening 12, which, in the installation position of the headlight 1 in the motor vehicle, faces forward in the driving direction in the direction of a roadway. A light module 20 with several LED light sources 21 is located in the interior of the headlight housing 10 here. The headlight 1 is equipped with a condensation protection device 30, which has an air duct 40 for guiding air 41. The air flow direction within the air duct 40 is symbolized by means of an arrow 41 here. The air duct 40 shown here is inclined essentially perpendicularly or slightly obliquely upwards, respectively, is fastened within the headlight housing 10, and has an air entry opening 42 on its lower end in the installation position, as well as an air exit opening 43 on its upper, curved end. The longitudinal axial direction of the straight length section of the air duct 40 is identified with reference numeral 44 in order to characterize the longitudinal axis of the air duct 10. The air duct 10 is made of a wall material 45 here, for example of a temperature-resistant plastic of polybutylene terephthalate (in short: PBT). An inner surface 46 of the air duct 40 is provided with a light-shielding coating 70 here, which largely absorbs visible light and prevents unwanted light reflection.

On the upper end of the air duct 40, a curved longitudinal axial section 50 connects to the straight longitudinal axial section 44 of the air duct 10. The air exit opening 43 is thus oriented essentially horizontally in the direction of the upper edge of the cover plate 11. An angle of curvature 52 between the straight longitudinal axial section 44 of the air duct 10 and the curved longitudinal axial section 50 is slightly larger than 90° here.

A radiation emitter 60, which is embodied as cost-efficient halogen light source 65 here, is arranged on the lower end of the air duct 40 in the region of the air entry opening 42. During the operation of the radiation emitter 60, the heated-up air rises up from bottom to top in the arrow direction 41 within the air duct 40, and leaves the air duct 40 downstream from the curved longitudinal axial section 50 through the air exit opening 43. In FIG. 1, a convection flow is outlined in a dashed manner, according to which the heated-up air in the housing interior of the headlight housing 10 flows along the inner side of the cover plate 11, is cooled down there, and reaches into the air duct 40 on the lower edge of the headlight housing 10, again through the air entry opening 42. In the air duct 40, the air, in turn, is heated up by the radiation emitter 60 and rises up again to the top in the arrow direction 43.

FIG. 2 shows possible versions of air ducts 40 with a curved (FIG. 2*a*) or a bent (FIG. 2*b*) longitudinal axial section in schematic drawings. The air ducts 40, which are illustrated purely schematically here, are to be understood as possible alternatives for the installation, for example into the headlight 1 shown in FIG. 1.

In FIG. 2*a*, the curved longitudinal axial section 50, which adjoins on the upper end of the straight longitudinal axial section 44 of the air duct 40, has a radius of curvature 51 as well as angle of curvature 52. Here, the radius of curvature 51 is, for example, 10 mm—with an assumed total installation length of the air duct 40 of approximately 100 mm. Here, the angle of curvature 52 of the curved longitudinal axial section 50 is, for example, 120° with respect to the axial direction 44 of the straight longitudinal axial section of the air duct 40. In the installation position of the air duct 40, the air exit opening 43 thus points obliquely downwards. A halogen light source 65 serves a radiation emitter 60 here.

In FIG. 2*b*, the air duct 40 has a bend, thus a curved longitudinal axial section 55 with a radius of curvature 56 of equal to zero or of 0 mm, respectively. This bend point is located between the lower straight longitudinal axial section 44 and the longitudinal axial section 44 of the air duct 40, which connects thereto at an angle of curvature 57 or here at a bend angle 57, respectively. The selected angle of curvature 57 or the bend angle 57 here, respectively, is, for example 110°. The lower straight longitudinal axial section 44 is oriented slightly obliquely upwards here. The upper or second straight longitudinal axial section 44, respectively, is oriented essentially horizontally here. In the installation position of the air duct 40, the air exit opening 43 thus points approximately horizontally into a non-illustrated headlight housing. An infrared radiator 61 serves as radiation emitter 60 here.

FIG. 3 shows a further embodiment according to the invention of a headlight 1 according to the invention with a condensation protection device 30 as well as twice-bent air duct 40 in the installation position within a headlight housing 10. The first curved longitudinal axial section 50 forms a bend point with a radius of curvature 51 with a radius of 0 mm as well as with an angle of curvature 52 of approximately 110°. The second curved longitudinal axial section 55 of the air duct 40 forms a bend point with a radius of curvature 56 with a radius of 0 mm as well as with an angle of curvature 57 of approximately 90°. Here, the heated-up air flows obliquely upwards out of the air exit opening 43 in the arrow direction 41.

Figure 4:
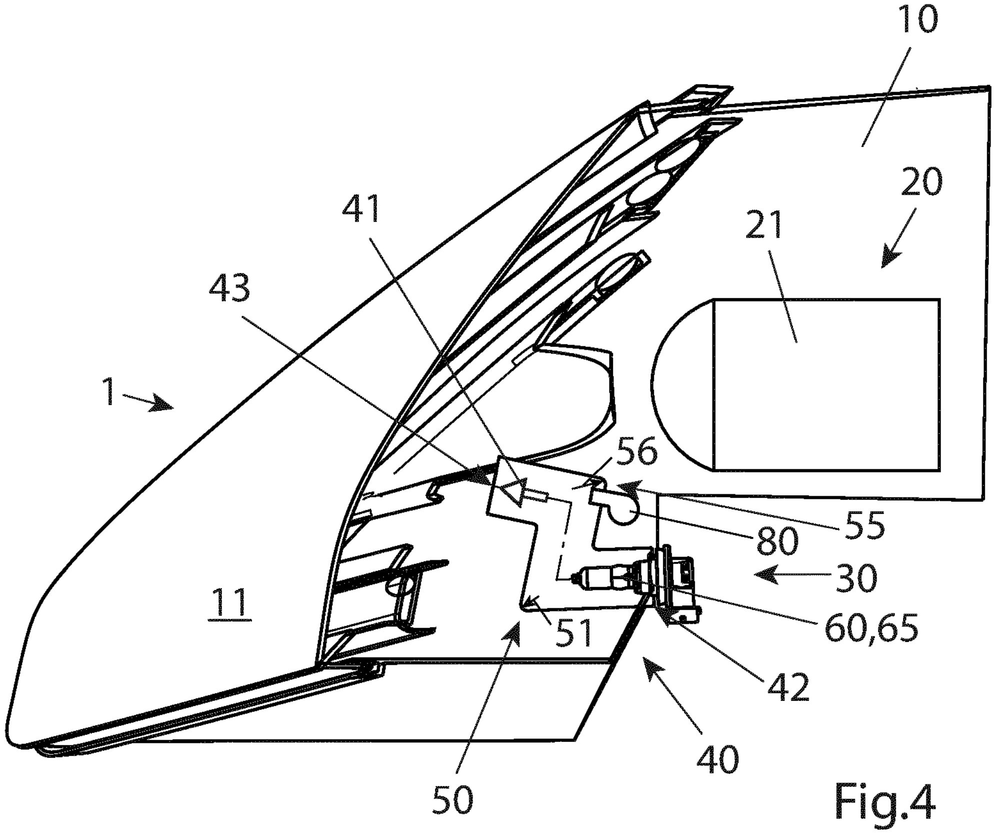
FIG. 4 shows a next embodiment according to the invention of a headlight in an exposed side view with a condensation protection device with a twice-curved air duct in the installation position within a headlight housing.

FIG. 4 shows a further embodiment according to the invention of a headlight 1 according to the invention with a condensation protection device 30 as well as a twice-curved air duct 40 in the installation position within a headlight housing 10. The first curved longitudinal axial section 50 has a radius of curvature 51 of 10 mm as well as with an angle of curvature 52 of approximately 110°. The second curved longitudinal axial section 55 of the air duct 40 has a radius of curvature 56 of 15 mm as well as an angle of curvature 57 of approximately 90°. Here, the heated-up air flows obliquely upwards out of the air exit opening 43 in the arrow direction 41. A fan blower 80 for improving the convection is additionally provided in the region of the second curved longitudinal axial section 55.

FIG. 5 shows a further embodiment according to the invention of a headlight 1 with a forked, in each case twice-curved air duct 40 of a condensation protection device 30 in the installation position within a headlight housing 10. On its opposite ends, the air duct 40 has two air exit openings 43, which are spaced apart from one another and which blow pre-heated air 41 into the interior of the headlight housing 10 on the upper and on the lower edge of the headlight housing 10. A radiation emitter 60 is located approximately centrally within the air duct 40 here.

FIG. 6 shows possible versions of air ducts 40 with a curved (FIG. 6*a*) or a bent (FIG. 6*b*) longitudinal axial section in schematic drawings. In contrast to the air ducts illustrated in FIGS. 2*a* and 2*b*, the air ducts 40 outlined here in each case have an air exit opening 43, which is formed in the form of a diffusor 75. The exit speed of the pre-heated air is reduced and evened out in a manner known per se by means of the diffusor 75. When using such air ducts 40, a particularly gentle and even heat-up of the interior of the headlight housing 10 is attained.

LIST OF REFERENCE NUMERALS

1 headlight for a motor vehicle
10 headlight housing
11 cover plate
12 light exit opening
20 light module
21 LED light source
30 condensation protection device
40 air duct
41 air, symbolized by means of an air flow (in the arrow direction)
42 air entry opening of the air duct
43 air exit opening of the air duct
44 longitudinal axis of the air duct or longitudinal axial section, respectively
45 wall material of the air duct
46 inner surface of the air duct
50 (first) curved longitudinal axial section of the air duct
51 radius of curvature
52 angle of curvature
55 (second) curved longitudinal axial section of the air duct
56 radius of curvature
57 angle of curvature
60 radiation emitter
61 infrared radiator
65 halogen light source
70 coating on the inner surface of the air duct
75 diffusor
80 fan blower

The invention claimed is:

1. A headlight (1) comprising:

a headlight housing (10) with a light exit opening (12), which is closed by means of a cover plate (11);

at least one LED light source (21), which is arranged in at least one light module (20) positioned in the headlight housing (10) for generating a specified light distribution in front of the headlight (1);

a condensation protection device (30) arranged in the headlight housing (10) with at least one air duct (40) for guiding air (41); and at least one radiation emitter (60), wherein the at least one air duct (40) has an air entry opening (42) and at least one air exit opening (43), and the at least one air exit opening (43) faces the cover plate (11), wherein the air (41) guided in the at least one air duct (40) can be heated by thermal radiation generated by the at least one radiation emitter (60), wherein the at least one radiation emitter (60) is arranged within the at least one air duct (40) in the region of the air entry opening (42), wherein the air duct (40) is made of an infrared radiation-reflecting and light-impermeable wall material (45), and the at least one air duct (40) has at least one curved longitudinal axial section (50) with a radius of curvature (51) and an angle of curvature (52) between the air entry opening (42) and the at least one air exit opening (43), and wherein the at least one air duct (40) between the air entry opening (42) and the at least one air exit opening (43) has a first curved longitudinal axial section (50) as well as, spaced apart therefrom in the longitudinal axial direction (44) of the air duct (40), at least one further, second curved longitudinal axial section (55).

2. The headlight (1) according to claim 1, wherein the radii of curvature (51, 56) and the angles of curvature (52, 57) of the first curved longitudinal axial section (50) and of the at least one further, second curved longitudinal axial section (55) are identical in each case.

3. The headlight (1) according to claim 1, wherein the radii of curvature (51, 56) and/or the angles of curvature (52, 57) of the first curved longitudinal axial section (50) and of the at least second curved longitudinal axial section (55) are different.

4. The headlight (1) according to claim 1, wherein the angle of curvature (52, 57) of the at least one curved longitudinal axial section (50, 55) of the air duct (40) is between 50° and 130°.

5. The headlight (1) according to claim 1, wherein the radius of curvature (51, 56) of the at least one curved longitudinal axial section (50, 55) of the air duct (40) is from 0 mm to 100 mm.

6. The headlight (1) according to claim 1, wherein the air duct (40) is made of a wall material (45), which is selected from sheet steel, aluminum, aluminum alloys, metal matrix composite material, plastic, temperature-resistant plastic, or plastic composite material.

7. The headlight (1) according to claim 1, wherein the radiation emitter (60) is an infrared radiator (61).

8. The headlight (1) according to claim 1, wherein the radiation emitter (60) is a halogen light source (65).

9. The headlight (1) according to claim 1, wherein the air duct (40) is equipped on its inner surfaces (46) with a visible light-absorbing, light-shielding coating (70).

10. The headlight (1) according to claim 1, wherein the corrosion protection device (30) furthermore comprises a fan blower (80), which fan blower (80) is connected to the air duct (40).

11. The headlight (1) according to claim 10, wherein the fan blower (80) is integrated in the air duct (40).

12. The headlight (1) according to claim 1, wherein the air exit opening (43) of the air duct (40) is formed as diffusor (75) for the even air distribution.

13. A motor vehicle with at least one headlight (1) according to claim 1.

14. The headlight according to claim 4, wherein the angle of curvature (52, 57) of the at least one curved longitudinal axial section (50, 55) of the air duct (40) is between 60° and 120°.

15. The headlight according to claim 4, wherein the angle of curvature (52, 57) of the at least one curved longitudinal axial section (50, 55) of the air duct (40) is between 70° and 110°.

16. The headlight (1) according to claim 5, wherein the radius of curvature (51, 56) of the at least one curved longitudinal axial section (50, 55) of the air duct (40) is from 1 mm to 80 mm.

17. The headlight (1) according to claim 1, wherein the radiation emitter (60) is a quartz radiator, a halogen radiator, or an infrared lamp.

18. The headlight (1) according to claim 9, wherein the light-shielding coating (70) is jet-black or another dark color.

19. The headlight (1) according to claim 1, wherein the headlight is a motor vehicle headlight.

* * * * *